United States Patent
Enomoto et al.

(10) Patent No.: US 9,185,350 B2
(45) Date of Patent: Nov. 10, 2015

(54) CONTENT SELECTING SYSTEM, PROVIDING APPARATUS, TRANSFER APPARATUS AND CONTENT SELECTING METHOD

(75) Inventors: Nobuyuki Enomoto, Tokyo (JP); Takeshi Katou, Tokyo (JP); Yasunori Okajima, Tokyo (JP); Tadashi Haneishi, Tokyo (JP); Go Mase, Tokyo (JP)

(73) Assignee: BIGLOBE INC., Tokyo (JP)

( * ) Notice: Subject to any disclaimer, the term of this patent is extended or adjusted under 35 U.S.C. 154(b) by 518 days.

(21) Appl. No.: 13/512,870

(22) PCT Filed: Oct. 4, 2010

(86) PCT No.: PCT/JP2010/067368
§ 371 (c)(1),
(2), (4) Date: Aug. 6, 2012

(87) PCT Pub. No.: WO2011/067980
PCT Pub. Date: Jun. 9, 2011

(65) Prior Publication Data
US 2012/0303752 A1 Nov. 29, 2012

(30) Foreign Application Priority Data
Dec. 1, 2009 (JP) .................. 2009-273321

(51) Int. Cl.
*G06F 15/16* (2006.01)
*H04N 7/173* (2011.01)
(Continued)

(52) U.S. Cl.
CPC ...... *H04N 7/17318* (2013.01); *G06F 17/30053* (2013.01); *G06F 17/30117* (2013.01);
(Continued)

(58) Field of Classification Search
CPC . H04L 63/0876; H04L 67/1095; H04L 67/16; H04L 67/26; H04L 67/28; H04L 12/189; H04L 67/103; G11B 27/002; G11B 20/10; G06F 17/30749; G06F 17/30053; G06F 17/30772; G06F 17/3017; G06F 17/30038; G06F 17/30581; G06F 17/30575; G06F 17/24; G06F 17/30607; G06F 11/1464; G06F 1/1613; G06F 17/30117; H04N 21/482; H04N 21/4828
USPC ................ 709/217, 248, 219, 232, 203, 246; 707/E17.009, 999.001, 736; 715/853, 715/810
See application file for complete search history.

(56) References Cited

U.S. PATENT DOCUMENTS 7,403,769 B2 * 7/2008 Kopra et al. ............... 455/414.1
7,647,346 B2 * 1/2010 Silverman et al. ..... 707/999.107
(Continued)

FOREIGN PATENT DOCUMENTS

JP 2002-366441 A 12/2002
JP 2004-046789 A 2/2004
(Continued)

OTHER PUBLICATIONS
International Search Report in PCT/JP2010/067368 dated Oct. 26, 2010 (English translation thereof).
(Continued)

*Primary Examiner* — Oleg Survillo
(74) *Attorney, Agent, or Firm* — McGinn IP Law Group, PLLC

(57) ABSTRACT

A file of menu data is transmitted from a providing apparatus to a storing apparatus via a transfer apparatus. The transfer apparatus acquires a list of files stored in the storing apparatus and transmits the list to the providing apparatus. The providing apparatus, based on the list, selects content to be stored in the storing apparatus.

19 Claims, 3 Drawing Sheets

(51) Int. Cl.
  *H04N 21/482* (2011.01)
  *G06F 17/30* (2006.01)
  *H04N 5/76* (2006.01)
  *H04N 21/472* (2011.01)
  *H04L 29/08* (2006.01)

(52) U.S. Cl.
  CPC .... *G06F17/30749* (2013.01); *G06F 17/30772* (2013.01); *H04N 5/76* (2013.01); *H04N 21/47202* (2013.01); *H04N 21/482* (2013.01); *H04N 21/4828* (2013.01); *G06F 17/30038* (2013.01); *G06F 17/30575* (2013.01); *H04L 67/28* (2013.01)

(56) References Cited

U.S. PATENT DOCUMENTS

| | | | |
|---|---|---|---|
| 7,752,202 | B2 | 7/2010 | Kobori et al. |
| 8,045,952 | B2 * | 10/2011 | Qureshey et al. ............. 455/344 |
| 8,606,684 | B2 * | 12/2013 | Bi et al. ........................ 705/37 |
| 8,682,722 | B1 * | 3/2014 | Des Jardins et al. ....... 705/14.49 |
| 2004/0015713 | A1 | 1/2004 | Abe et al. |
| 2004/0172376 | A1 | 9/2004 | Kobori et al. |
| 2005/0198024 | A1 * | 9/2005 | Sakata et al. ...................... 707/4 |
| 2006/0143184 | A1 | 6/2006 | Kobayashi et al. |
| 2006/0236349 | A1 * | 10/2006 | Lee ................................. 725/80 |
| 2007/0078899 | A1 * | 4/2007 | Gulin et al. .................... 707/200 |
| 2007/0083676 | A1 * | 4/2007 | Rabbers et al. ................ 709/247 |
| 2007/0088764 | A1 * | 4/2007 | Yoon et al. ..................... 707/201 |
| 2009/0228833 | A1 * | 9/2009 | Nakayama .................... 715/810 |
| 2009/0327449 | A1 * | 12/2009 | Silverman et al. ............ 709/217 |

FOREIGN PATENT DOCUMENTS

| | | |
|---|---|---|
| JP | 2005-184783 A | 7/2005 |
| JP | 2006-094376 A | 4/2006 |
| JP | 2006-186438 A | 7/2006 |
| JP | 2008-065384 A | 3/2008 |
| JP | 2009-048393 A | 3/2009 |
| JP | 2009-140416 A | 6/2009 |
| TW | 200739533 | 8/2007 |
| WO | WO 02/103529 A1 | 12/2002 |
| WO | WO 03/098446 A1 | 11/2003 |
| WO | WO 2011/067980 A1 | 9/2011 |

OTHER PUBLICATIONS

Taiwanese Office Action dated Oct. 21, 2013, with partial English translation.

* cited by examiner

| Genre (Directory) | Menu | Content 1st Image | Content 2nd image | .... | Content nth image |
|---|---|---|---|---|---|
| Weather | Menu_W.jpg | W001.jpg | W002.jpg | .... | W00n.jpg |
| News | Menu_N.jpg | N001.jpg | N002.jpg | .... | N00n.jpg |
| Fortune-telling | Menu_F.jpg | F001.jpg | F002.jpg | .... | F00n.jpg |

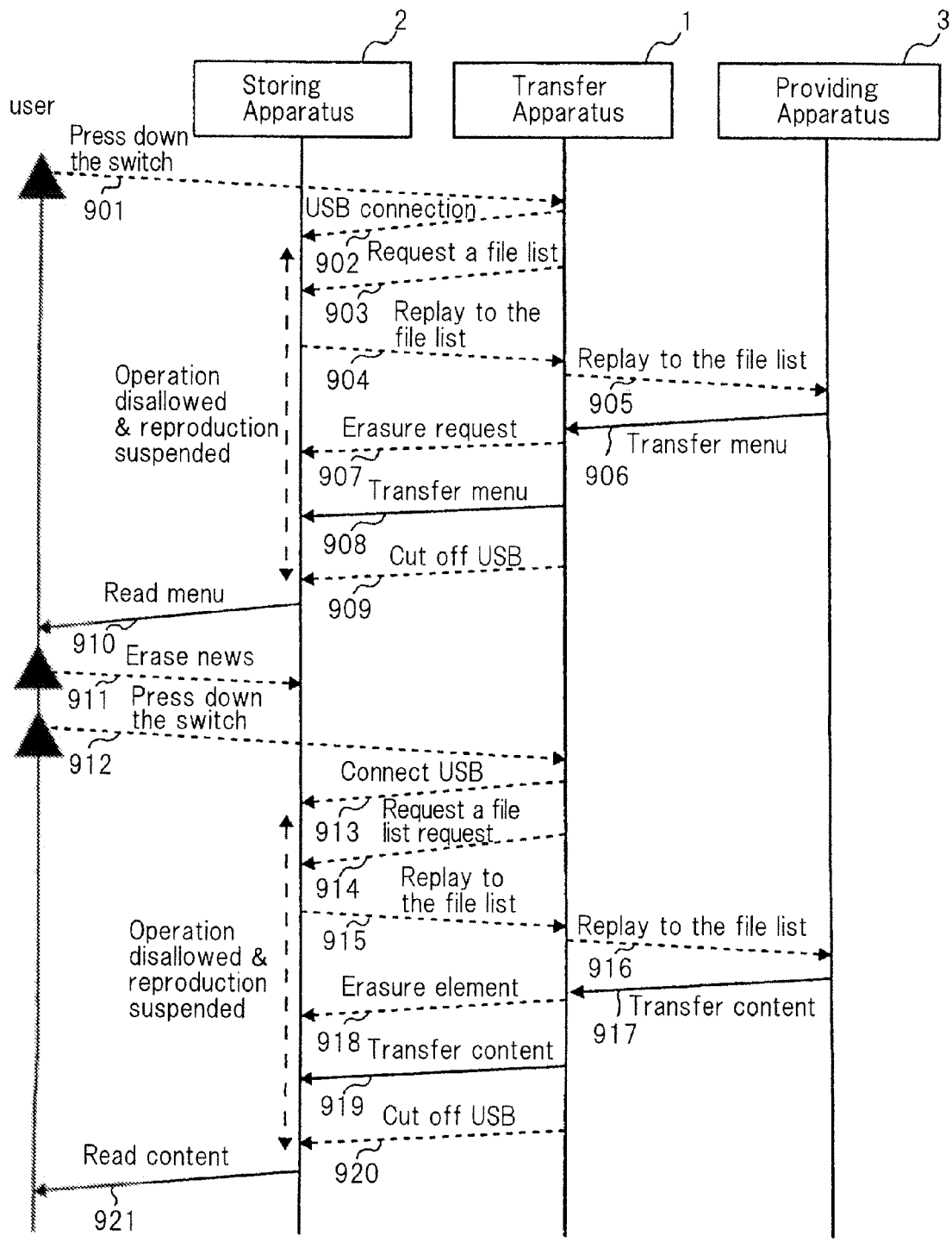

CONTENT SELECTING SYSTEM, PROVIDING APPARATUS, TRANSFER APPARATUS AND CONTENT SELECTING METHOD

TECHNICAL FIELD

The present invention relates to a distributing scheme of content such as images, music, video and the like, in particular, relating to a technology for enabling even an apparatus that has no network function such as a digital photo frame to select content.

BACKGROUND ART

In recent years, there has been widely used a system in which an information terminal such as a mobile communication device that has a content playing function and a network function is connected to a server to synchronize content between the information terminal and the server and to distribute content from the server to the information terminal. The purpose of synchronization of content that is described herein is to make the update of the contents in the server and the information terminal in cooperation via a network. For example, if server stores content that is not stored in the information terminal, the content can be distributed from the server to the information terminal at the user's request. Synchronization of content makes it possible for the user to download newly content registered in the server to the information terminal by the network.

Also, patent document 1 discloses a technology relating to synchronization of content. The technology disclosed in patent document 1 is to prevent content that was once distributed to, but deleted at, an information terminal, from being distributed to the information once again. In the information terminal described in patent document 1, "deleted" files and "undistributed" files are managed distinctively.

RELATED ART LITERATURE

Patent Document

Patent Document 1: JP2009-048393A

SUMMARY OF THE INVENTION

Problems to be Solved by the Invention

By the way, the information terminal having a network function is not the sole device that is used to store and play content such as music, images, movies and the like. For example, information terminals having no network function such as a photo frame, portable music player and the like can also be used. Naturally, such an information device has no user interface for receiving the distribution of content.

In order to store the content supplied from the server into such an information device, the user is forced to carry out complicated tasks including acquisition of the content by a mobile communication terminal or personal computer having a network function and writing the acquired content into the information device with no network function. Further, the server is also required to provide GUIs (Graphic User Interface) for content distribution, such as a general purpose website to be used by personal computers and a website for mobile communication terminals, to the user.

It is an object of present invention to provide a technology that enables an information terminal, that has no interface for selecting content, to be operated to select content.

Means for Solving the Problems

In order to achieve the above object, a content selecting system of the present invention is to select content to be stored in a storing apparatus, includes:

a providing apparatus for providing a file contains menu data of content; and, a transfer apparatus connecting between the storing apparatus and the providing apparatus, in which the providing apparatus transmits a file contains menu data to the storing apparatus by way of the transfer apparatus, the transfer apparatus acquires the list of files stored in the storing apparatus, from the storing apparatus and transmits the list to the providing apparatus, and the providing apparatus selects a content to be stored in the content, based on the list.

A providing apparatus of the present invention is an providing apparatus for providing a menu of content, in a content selecting system for selecting a content to be stored in a storing apparatus, and includes:

a communication means connecting to a network; and a determining means that transmits a file that contains menu data to the storing apparatus via the communication means, acquires a list of files stored in the storing apparatus from the storing apparatus and selects a content to he stored in the storing apparatus, based on the list.

A transfer apparatus of the present invention is a transfer apparatus in a content selecting system for selecting a content to be stored in a storing apparatus, connecting between the storing apparatus and a providing apparatus for providing a file of menu data of content, and includes:

a first communication means connecting to the storing apparatus;

a second communication means connecting to the providing apparatus via a network; and, a control means that acquires a file that contains menu data from the providing apparatus by way of the second communication means, transmits the file to the storing apparatus via the first communication means, acquires the list of files stored in the storing apparatus, from the storing apparatus, transmits the list to the providing apparatus by way of the second communication means.

A content selecting method of the present invention is a content selecting method for selecting a content to be stored in a storing apparatus, and includes the steps of:

transmitting a file of menu data of content to the storing apparatus;

acquiring a list of files stored in the storing apparatus, form the storing apparatus; and, selecting a content to be stored in the storing apparatus, based on the list.

A content selecting program of the present invention is a content selecting program for selecting a content to be stored in a storing apparatus by means of a computer, and causes the computer to execute:

a step of transmitting a file of menu data of content to the storing apparatus;

a step of acquiring a list of files stored in the storing apparatus, from the storing apparatus; and, a step of selecting a content to be stored in the storing apparatus, based on the list.

BRIEF DESCRIPTION OF THE DRAWINGS

[FIG. 5] is a sequence chart showing an operational example of a content distribution system in the present exemplary embodiment.

MODE FOR CARRYING OUT THE INVENTION

The mode for carrying out the present invention will be described in detail with reference to the drawings.

Figure 1:
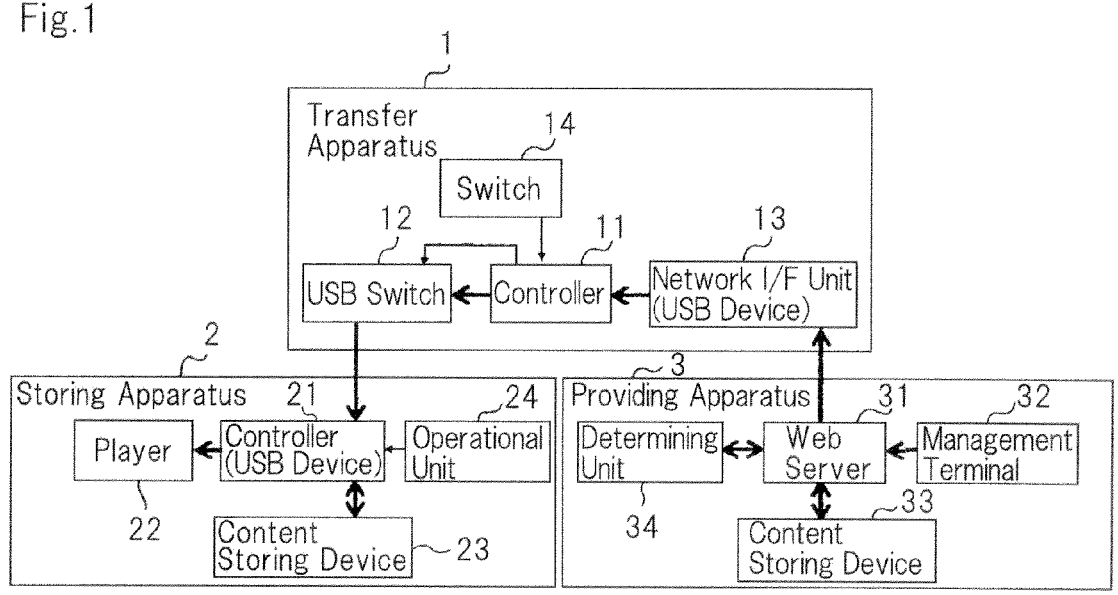
[FIG. 1] is a block diagram showing a configuration of a content distribution system in the present exemplary embodiment.

FIG. 1 is a block diagram showing a configuration of a content distribution system in the present exemplary embodiment. In the drawing, the system and the configurations of the individual apparatuses and the relationship of connection between those are shown.

Referring to FIG. 1, the content distribution system of the present exemplary embodiment includes transfer apparatus 1, storing apparatus 2 and providing apparatus 3.

Transfer apparatus 1 is a compact communication terminal that is installed near storing apparatus 2 and connected to storing apparatus 2 via USB (Universal Serial Bus). Transfer apparatus 1 acquires information from providing apparatus 3 connected therewith via the internet and transfers the information to storing apparatus 2 via USB.

Transfer apparatus 1 includes controller 11, USB switch 12, network interface (I/F) unit 13 and switch 14.

Controller 11 includes a CPU (Central Processing Unit) and a memory for temporal storage, and executes software programs using the CPU with the memory to achieve functions of various kinds. For example, when receiving an event startup signal from switch 14, controller 11 actuates an event and executes a predetermined process.

Controller 11 further has a USB host function and controls USB devices such as controller 21, network I/F unit 13 and the like. For example, controller 11 controls controller 21 inside storing apparatus 2 by USB connection through USB switch 12

Also, controller 11 is further connected to USB switch 12 via parallel interface to perform on and off control of the USB connection between controller 11 and controller 21, One example of parallel interface is GPIO (General Purpose Input/Output).

Controller 11 communicates with web server 31 included in providing apparatus 3 through network I/F unit 13.

USB switch 12 receives a request signal for turning on or off the USB connection, from controller 11 via parallel interface, and controls the USB connection between controller 11 and controller 21 in accordance with the request signal. The USB connection control is performed by controlling either the USB signal line or power supply line or controlling both of them. Here, if it is not particularly specified, USB switch 12 is assumed to control both the signal line and the power supply line.

Network I/F unit 13 is connected to controller 11 by USB and communicates with web server 31, following instructions from controller 11. Network I/F unit 13 receives data from controller 11 and transmits the data to web server 31 and receives data from web server 31 and transmits the data to controller 11.

On example of switch 14 is a push button switch, which generates an event startup signal for starting a series of processing by controller 11 and transmits the signal to controller 11 when the switch is pressed down.

Storing apparatus 2 is an information terminal that stores content and plays the content. For example, the apparatus is a digital photo frame that displays image content or a portable music player for playing music content.

Storing apparatus 2 includes controller 21, player 22, content storage device 23 and operational unit 24.

Storing apparatus 2 receives content from transfer apparatus 1 connected thereto via USB and stores the content into content storage device 23. Storing apparatus 2 plays the content that is stored in content storage device 23 by means of player 22.

Controller 21 is connected by USB to controller 11 via USB switch 12. In this USB connection, controller 11 is the USB host. Controller 21, following instructions from controller 11 as the USB host, manages the files that contain content in content storage device 23. Manages the files herein include storage, reading and erasing of files and acquiring of the file list.

Also, controller 21, following the instructions from operational unit 24, reads out data from content storage device 23 and causes player 22 to play. Further, controller 21, following the instructions from operational unit 24, causes player 22 to display the list of files inside content storage device 23 or erases a designated file in content storage device 23.

Since there is a risk that the data inside content storage device 23 will be damaged if the instruction from controller 11 collides with the instruction from operational unit 24, controller implements mutual exclusion control in order to avoid collision between the instruction from controller 11 and the instruction from operational unit 24. Specifically, controller 21 will not respond to any input from operational unit 24 while USB connection with controller 11 is turned on. Accordingly, the user is permitted to operate operational unit 24 only when the USB connection between controller 11 and controller 21 is turned off. Further, controller 21 interrupts reproduction of data by player 22 while the USB connection with controller 11 is turned on.

Player 22, receives instruction from controller 21, and reproduces content in accordance with the instruction. Reproduction of content means video displaying, and sound playback.

Content storage device 23 includes a memory such as, for example a hard disk, flash memory and the like, and receives a file from controller 21 and stores the file in the memory. Further, content storage device 23 offers the list of stored files to controller 21, at the request of controller 21. Content storage device 23 also transfers a stored file to controller 21, at the request of controller 21. Moreover, content storage device 23 erases a file stored in the memory at the request of controller 21.

Operational unit 24 is, for example, a push-button type switch is operated when the user pushes the button and sends an operational input signal to controller 21. Upon this, operational unit 24, in accordance with the user operation, generates an operational input signal that indicates cursol movement, playing or stop of content, erasure of a file or the like.

Providing apparatus 3 is a server that retains files that contains content registered by the manager and is connected with transfer apparatus 1 via the internet to distribute content to storing apparatus 2 by way of transfer apparatus 1. Providing apparatus 3 includes web server 31, management terminal 32, content storing device 33 and determining unit 34.

Web server 31 receives content input from management terminal 32 and stores the content in designated genre directories in content storage device 33. Web server 31 receives a file list transmitted from transfer apparatus 1 via the internet and sends the list to determining unit 34. When receiving the result of determination of determining unit 34 based on the file list, the web server transmits the result to transfer apparatus 1. Thereafter, web server 31 receives a content transfer request from transfer apparatus 1, and reads out the content to be distributed from content storage device 33 and transfers the content to transfer apparatus 1.

Management terminal 32 is a device that accepts an operation from the manager. Management terminal 32 receives a content input by the manager and designation of the genre of the content, and stores the content in a region determined in accordance with the designated genre, in content storage device 33 by way of web server 31. The genre used herein indicates a category into which content is classified. For example, content is classified into categories such as news, weather, fortune-telling, etc.

Content storage device 33 includes a memory such as, for example a hard disk, flash memory and the like, and receives files from web server 31 and stores the files in directories set for different categories.

Further, content storage device 33 offers a list of stored files to web server 31, by request of web server 31. Content storage device 33 also transfers a stored file to web server 31, at the request of web server 31. Moreover, content storage device 33 erases a stored file by request of web server 31.

Determining unit 34 receives the file list of the content stored in storing apparatus 2, from transfer apparatus 1, and determines whether there is a file to be distributed to storing apparatus 2, based on the file list, and further determines the file to be distributed if there is a file to be distributed. Then, if there a file to be distributed, determining unit 34 reads out the file from content storage device 33 and distributes the file.

Figure 2:
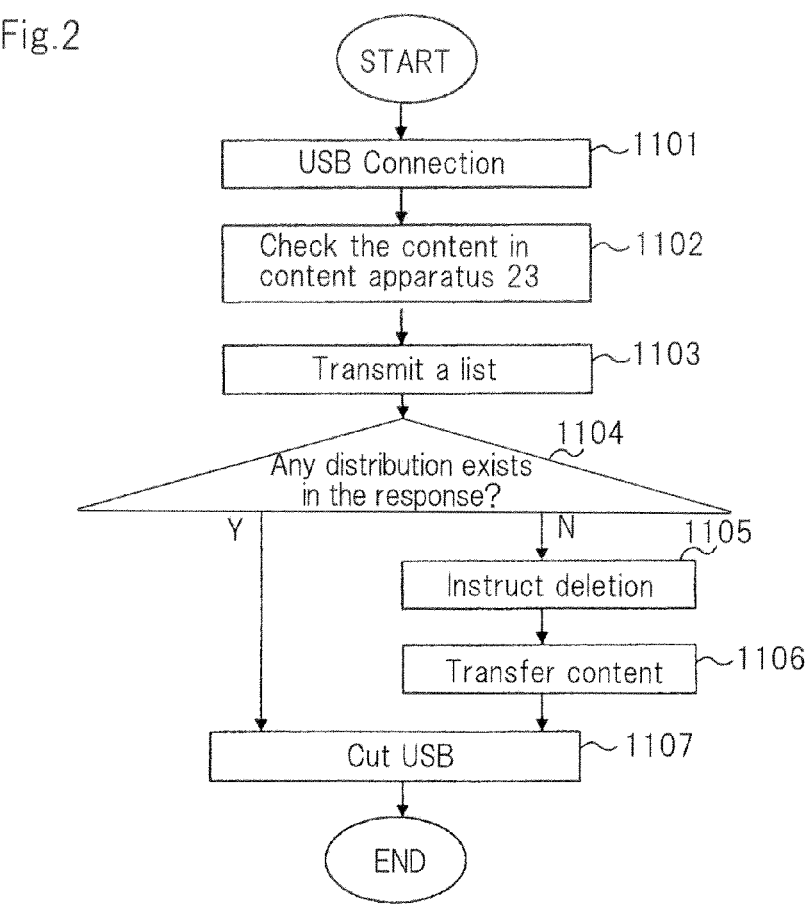
[FIG. 2] is a flow chart showing the operation of controller 11 when an event startup signal is received from switch 14.

FIG. 2 is a flow chart showing the operation of controller when an event startup signal is received from switch 14.

Controller 11, as receiving an event startup signal from switch 14, instructs USB switch 12 to turn on the USB connection between controller 11 and controller 21 via parallel interface (Step 1101).

When confirming that the USB connection with controller 21 has been turned on, controller 11 acquires the list of the files stored in content storage device 23 inside storing apparatus 2, or the old content list that was obtained previously (Step 1102). Subsequently, controller 11 transmits the list obtained at Step 1102 to determining unit 34 in providing apparatus 3, by way of network I/F unit 13 and web server 31 (Step 1103).

Thereafter, controller 11 receives a response regarding the determined result from determining unit 34.

Controller 11 goes to Step 1107 if the response indicates "no distribution exists" and goes to Step 1105 if the response indicates "distribution exists" (Step 1104).

At Step 1105, controller 11 erases the file stored in content storage device 23 that is inside storing apparatus 2, or the old content file that was obtained previously.

When erasure of the file is completed, controller 11 requests that providing apparatus 3 to transfer content, via network I/F unit 13. Then, controller 11 stores the file contains the content received from providing apparatus 3 in content storage device 23 inside storing apparatus 2 (Step 1106).

At Step 1107, controller 11 instructs USB switch 12 to turn off the USB connection between controller 11 and controller 21, via parallel interface (Step 1107).

From Steps 1101 to 1107, storing apparatus 2 will not accept any operation inputted to operational unit 24, and enters a state in which player 22 does not perform reproduction.

Figures 3, 4:
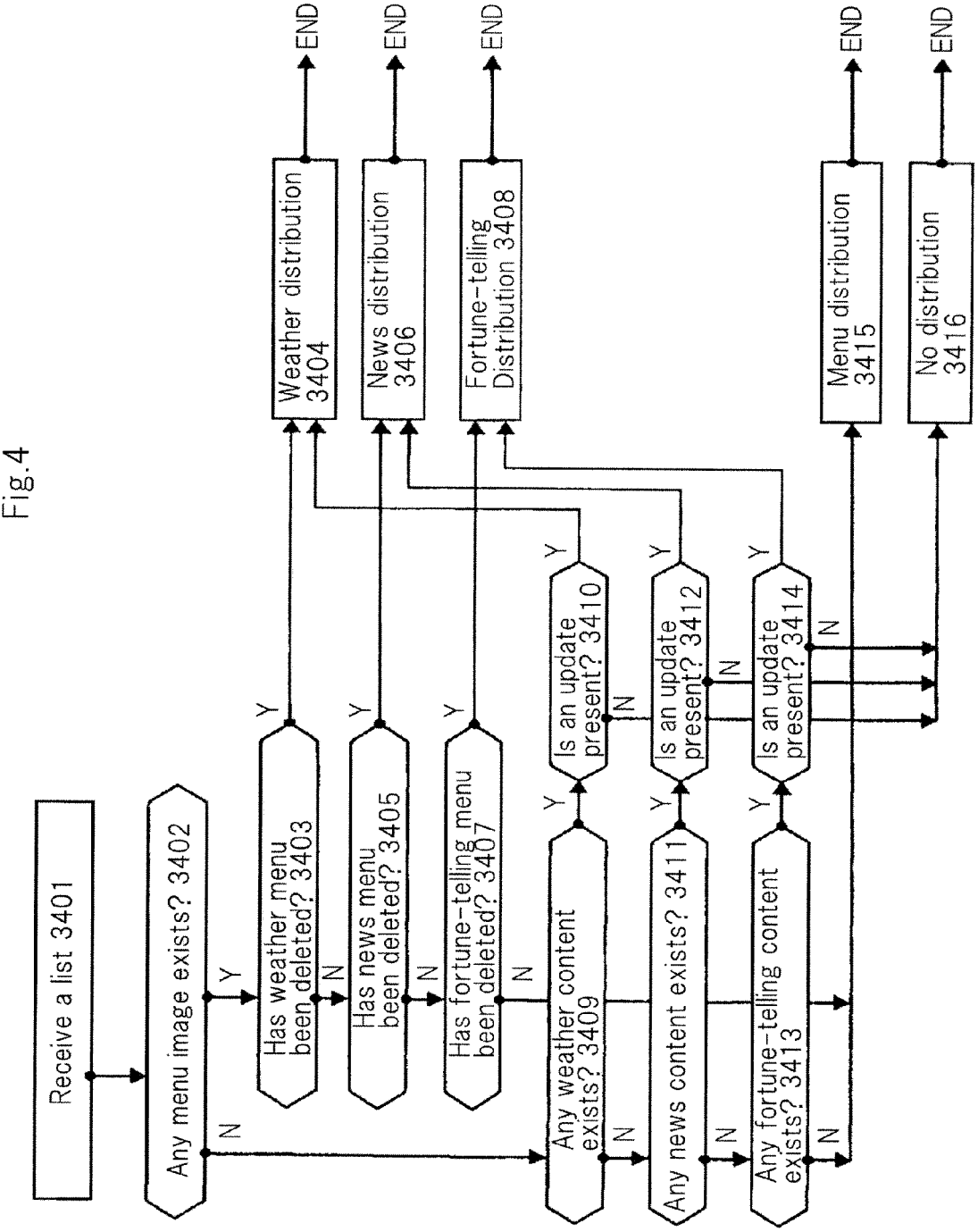
[FIG. 3] is a table showing a configurational example of files stored in content storing device 33.
[FIG. 4] is a flow chart showing an operation of determining unit 34.

FIG. 3 is a table showing a configurational example of files stored in content storage device 33. FIG. 4 is a flow chart showing the operation of determining unit 34.

In content storage device 33, directories for individual categories such as weather, news, fortune-telling and the like are created, and in each directory, one menu file and n contents (n is an integer equal to or greater than zero) are stored.

In the example of FIG. 3, the weather category has one menu file Menu_W.jpg and n content files W001.jpg, W002.jpg, . . . , W00n.jpg stored in the weather directory.

Referring to FIG. 4, determining unit 34 receives the list of files stored in content storage device 23 of storing apparatus 2, from controller 11 of transfer apparatus 1 by way of network unit 13 and web server 31 (Step 340)).

Determining unit 34 checks whether the received list includes a menu image (Menu_*.jpg) (Step 3402). Determining unit 34 goes to Step 3403 if the list includes the menu image and to Step 3409 if the list does not include any menu image.

At Step 3403, determining unit 34 checks whether the weather menu has been deleted from the list. If the weather menu has been deleted from the list, determining unit 34 distributes files (W001.jpg~W00n.jpg) other than the menu in the weather directory to storing apparatus 2 via transfer apparatus 1 (Step 3404). Unless the weather menu has been deleted from the list, determining unit 34 goes to Step 3405.

At Step 3405, determining unit 34 checks whether the news menu has been deleted from the list. If the news menu has been deleted from the list, determining unit 34 distributes files (N001.jpg~N00n.jpg) other than the menu in the news directory to storing apparatus 2 via transfer apparatus 1 (Step 3406). Unless the news menu has been deleted from the list, determining unit 34 goes to Step 3407.

At Step 3407, determining unit 34 checks whether the fortune-telling menu has been deleted from the list. If the fortune-telling menu has been deleted from the list, determining unit 34 distributes files (F001.jpg~F00n.jpg) other than the menu in the fortune-telling directory to storing apparatus 2 via transfer apparatus 1 (Step 3408). Unless the fortune-telling menu has been deleted from the list, determining unit 34 goes to Step 3415.

At Step 3415, determining unit 34 distributes menus (Menu_W.jpg, Menu_N.jpg, Menu_F.jpg).

At Step 3409, determining unit 34 checks whether there is weather content in the list. If there is no weather content in the list, determining unit 34 goes to Step 3411. If there is weather content in the list, determining unit 34 checks whether an update is present based on the time stamp added to the content (Step 3410). Determining unit 34 goes to Step 3404 if an update is present, and goes to Step 3416 if no update is present.

At Step 3416, determining unit 34 determines that there is no content to be distributed and will not distribute any file.

At Step 3411, determining unit 34 checks whether there is news content in the list. If there is no new content in the list, determining unit 34 goes to Step 3413. If there is news content in the list, determining unit 34 checks whether an update is present based on the time stamp added to the content (Step 3412). Determining unit 34 goes to Step 3406 if an update is present, and goes to Step 3416 if no update is present.

At Step 3413, determining unit 34 checks whether there is a fortune-telling content in the list. If there is no new content in the list, determining unit 34 goes to Step 3415. If there is fortune-telling content in the list, determining unit 34 checks whether an update is present based on the time stamp added to the content (Step 3414). Determining unit 34 goes to Step 3408 if an update is present, and goes to Step 3416 if no update is present.

FIG. 5 is a sequence chart showing an operational example of a content distribution system in the present exemplary embodiment. FIG. 5 shows exchange of information between transfer apparatus 1, storing apparatus 2, providing apparatus 3 and the user. The operational example shown herein includes a menu acquisition process, a content selection process and a news content acquisition process. That is, this operational example shows an example of operation when the user acquires menus and deletes the news menu from the menus to select the news content and acquire that content.

In the initial condition, assumed that no file is stored in content storage device 23 inside storing apparatus 2. It is also assumed that the manager of providing apparatus 3 inputs one menu image with three content images for each of weather, news and fortune-telling.

(Menu Acquisition Process)

The user presses switch 14 of transfer apparatus 1 to activate a menu acquisition operation (Step 901).

In transfer apparatus 1, controller 11 gives instructions to USB switch 12 via parallel interface to turn on the USB connection between controller 11 and controller 21. USB switch 12 turns on the USB connection by connecting the USB signal line and USB power supply line between controller 11 and controller 21.

Controller 21 detects connection with controller 11 and stops reception of operations from operational unit 24. At the same time, if player 22 is performing a reproduction process, controller 21 forcibly stops the reproduction process (Step 902). The reproduction process herein is a process of playing content, examples include processes of slide-show displaying of image content and playing of music content.

When confirming connection with controller 21 inside storing apparatus 2, controller 11 requests that controller 21 provide the list of files stored in content storage device 23 (Step 903). Controller 21 acquires the file list from content storage device 23 and transfers the list to controller 11 (Step 904). Since there is no file stored in content storage device 23 at this point, the file list shows that there is no file.

Controller 11, after receiving the file list from controller 21, transfers the received file list to determining unit 34 in providing apparatus 3 via network I/F unit 13 and web server 31 (Step 905).

When receiving the file list from controller 11, determining unit 34 determines that menu images should be sent, based on the fact that there is no file in the list. Then determining unit 34 reads out menu images (Menu_W.jpg, Menu_N.jpg, Menu_F.jpg) from content storage device 33 and transfers the images to controller 11 of transfer apparatus 1 by way of web server 31 and network I/F unit 13 (Step 906).

When receiving the menu images from determining unit 34, controller 11 instructs controller 21 of storing apparatus 2 to erase all the files stored in content storage device 23 (Step 907). Controller 21, when receiving a request for erasure from controller 11, terminates the process directly because there is no file in content storage device 23 in this case.

After sending out a request for erasure at Step 907, controller 11 transfers the menu images received at Step 906 to controller 21 of storing apparatus 2 (Step 908). Controller 21 receives the files transferred from controller 11 and stores the files in content storage device 23. In this way, menu images, Menu_W.jpg, Menu_N.jpg, Menu_F.jpg, are stored in content storage device 23.

After completion of transfer of the menu images, controller 11 instructs USB switch 12 to turn off the USB connection between controller 11 and controller 21 via parallel interface (Step 909). USB switch 12, upon receiving the instruction from controller 11, shuts off the USB signal line and USB power supply line between controller 11 and controller 21, to thereby turn off the USB connection.

Controller 21 of storing apparatus 2 detects the shutoff of the USB connection with controller 11 and restarts reception of operations from operational unit 24. At the same time, if a reproduction process has been performed before the USB connection with controller 11 was turned on, controller 21 restarts that reproduction process (Step 910).

(Content Selection Action)

Herein, it is assumed that the user requests distribution of news. For this purpose, the user deletes the news menu image by operating operational unit 24 of the information presenting apparatus. Controller 21 having received the operational input from operational unit 24 deletes the news menu image, Menu_N.jpg of the three menu images (Menu_W.jpg, Menu_N.jpg, Menu_F.jpg) stored in content storage device 23 (Step 911).

(News Content Acquisition Process)

Here, the user presses down switch 14 of transfer apparatus 1 to thereby actuate a content acquisition process (Step 912).

Controller 11 of transfer apparatus 1 instructs USB switch 12 to turn on the USB connection between controller 11 and controller 21 via parallel interface. USB switch 12 connects the USB signal line and the USB power supply line between controller 11 and controller 21 to turn on the USB connection (Step 913). Controller 21 detects the USB connection with controller 11 and stops reception of operations from operational unit 24. At the same time, if player 22 is performing a reproduction process, controller 21 forcibly stops the reproduction process.

When controller 11 can confirm the USB connection with controller 21 that is inside storing apparatus 2, controller 11 requests controller 21 for the list of files stored in content storage device 23 (Step 914).

Controller 21 acquires the file list from content storage device 23 and transfers the list to controller 11 (Step 915). At this point, since content storage device 23 has two menu images, Menu_W.jpg and Menu_F.jpg stored therein, these are given on the file list.

When receiving the file list from controller 21, controller 11 transfers the file list to determining unit 34 of providing apparatus 3 by way of network I/F unit 13 and web server 31 (Step 916).

Determining unit 34, upon receiving the file list from controller 11, determines that the news content image should be distributed, based on the facts that there are some menu images in the file list while the news menu image has been deleted. Then, determining unit 34 reads out news content images (N001.jpg, N002.jpg and N003.jpg) from content storage device 33 and then transfers the images to controller 11 of transfer apparatus 1 by way of web server 31 and network I/F unit 13 (Step 917).

Controller 11, upon receiving the news content images from determining unit 34, instructs controller 21 of storing apparatus 2 to erase all the files stored in content storage device 23.

Controller 21, upon receiving an erasure request from controller 11, erases Menu_W.jpg and Menu_F.jpg inside content storage device 23 (Step 918).

After sending out the erasure request at Step 918, controller 11 transfers the news content images received at Step 917 to controller 21 of storing apparatus 2 (Step 919). Controller 21, upon receiving the files transferred from controller 11, stores the files in content storage device 23. Thus, news content images N001.jpg, N002.jpg and N003.jpg are stored in content storage device 23.

Controller 11, after completion of transfer of content images, instructs USB switch 12 via parallel interface to turn off the USB connection between controller 11 and controller 21. USB switch 12 receives instructions from controller 11 and cuts off the USB signal line and USB power supply line between controller 11 and controller 21 to thereby turn off the USB connection (Step 920).

When detecting the fact that its USB connection with controller 11 has been turned off, controller 21 restarts reception of operations from operational unit 24. At the same time, if a reproduction process has been performed before the USB connection with controller 11 was turned on, controller 21 restarts that reproduction process (Step 921). As a result, storing apparatus 2 enables the user to read the news content.

As has been described heretofore, according to the present exemplary embodiment, providing apparatus 3 determines which menu image was deleted, based on the file list which the providing apparatus has received from storing apparatus 2 via transfer apparatus 1, and determines which content was selected, based on the determined result. As a result, the user becomes able to select content that the user wants to be distributed, by performing a file delete operation to storing apparatus 2 that includes no interface for selecting content.

Though description of the present exemplary embodiment was given by taking an example in which the user deletes a certain menu image to thereby select a content belonging to the category of that menu image so as to make a request to providing apparatus 3, the present invention should not be limited to this. As an example of opposite, the user may leave a certain menu image alone to thereby select content belonging to the category of that menu image so as to make a request to providing apparatus 3.

Also, though description of the present exemplary embodiment was given by taking an example in which the user makes a request for content in a single category, the present invention should not be limited to this. As another example, the user may he permitted to select contents of multiple categories. In this case, when, for example, the user deletes multiple menu images, it is possible to determine that the content of the categories corresponding to those menu images have been selected.

Although the present invention has been explained by exemplifying the exemplary embodiment, the present invention should not be limited to the present exemplary embodiment. Various modifications may be made within the scope of the technical thought.

Further, providing apparatus 3 of the above-described exemplary embodiment can also be realized by causing a computer to execute a software program that defines the processing procedures of various components forming the apparatus.

This application claims priority based on Japanese Patent Application No. 2009-273321, filed on Dec. 1, 2009, and should incorporate all the disclosure thereof herein.

What is claimed is:

1. A content selecting method for selecting a content to be transmitted to a storing apparatus, said method comprising:
   (i) transmitting a plurality of files containing menu data to the storing apparatus by way of a transfer apparatus configured to connect between the storing apparatus and a providing apparatus configured to provide the plurality of files containing menu data;
   (ii) deleting, by the storing apparatus, one of the plurality of files containing menu data from a memory of the storing apparatus;
   (iii) acquiring a list of files remaining stored in the storing apparatus, from the storing apparatus by the transfer apparatus, and transmitting the list to the providing apparatus;
   (iv) selecting, by the providing apparatus, a content file to be transmitted to the storing apparatus based on the list and a correspondence table, wherein selecting includes determining, by the providing apparatus, the content file as corresponding to the one of the plurality of files containing menu data which has been deleted at the storing apparatus as a selection, and
   (v) transmitting, by the providing apparatus, the selected content file to the storing apparatus by way of the transfer apparatus.

2. A non-transitory computer-readable medium containing program instructions for selecting a content to be transmitted to a storing apparatus, wherein execution of the program instructions by one or more processors of a computer system causes the one or more processors to carry out:
   (i) transmitting a plurality of files containing menu data to the storing apparatus by way of a transfer apparatus configured to connect between the storing apparatus and a providing apparatus configured to provide the plurality of files containing menu data;
   (ii) deleting, by the storing apparatus, one of the plurality of files containing menu data from a memory of the storing apparatus;
   (iii) acquiring a list of files remaining stored in the storing apparatus, from the storing apparatus by the transfer apparatus, and transmitting the list to the providing apparatus;
   (iv) selecting, by the providing apparatus, a content file to be transmitted to the storing apparatus based on the list and a correspondence table, wherein selecting includes determining, by the providing apparatus, the content file as corresponding to the one of the plurality of files containing menu data which has been deleted at the storing apparatus as a selection, and
   (v) transmitting, by the providing apparatus, the selected content file to the storing apparatus by way of the transfer apparatus.

3. A providing apparatus for providing a menu of content, in a content selecting system for selecting a content to be transmitted to a storing apparatus, said providing apparatus comprising:
   a content storing device that stores a plurality of files containing menu data;
   a communicating unit configured to connect to a network; and
   a determining unit configured to:
   (i) transmit a plurality of files that contain menu data to the storing apparatus via the communicating unit,
   (ii) acquire a list of files stored in the storing apparatus from the storing apparatus, wherein the list of acquired files includes only a subset of the plurality of files that contain menu data previously stored at the storing apparatus,
   (iii) select a content the to be transmitted to the storing apparatus, based on the list and a correspondence table, wherein the determining unit determines the content file as corresponding to one of the plurality of files containing menu data which has been deleted at the storing apparatus as a selection, wherein the deleted one of the plurality of files containing menu data is excluded from the subset, and (iv) transmit the selected content file to the storing apparatus by way of the communicating unit.

4. The providing apparatus according to claim 3, wherein: the menu data represents a menu image for each content category, and the determining unit is configured to determine based on the list and the correspondence table, the category of the menu image that has been deleted at the storing apparatus and determines based on the determined result, a category of the content that has been selected.

5. The providing apparatus according to claim 3, wherein the determining unit is configured to retain content files other than the file that corresponds to the deleted one of the plurality of files containing menu data.

6. A content selecting system that selects a content to be transmitted to a storing apparatus, said system comprising:
said storing apparatus comprising a content storing device;
a providing apparatus configured to provide a plurality of files of menu data of content; and
a transfer apparatus configured to connect between the storing apparatus and the providing apparatus,
wherein:
(i) the providing apparatus transmits a plurality of files containing menu data to the storing apparatus by way of the transfer apparatus,
(ii) the storing apparatus deletes one of the plurality of files containing menu data from the content storing device,
(iii) the transfer apparatus acquires a list of files remaining stored in the storing apparatus, from the storing apparatus, and transmits the list to the providing apparatus,
(iv) the providing apparatus selects a content file to be transmitted to the storing apparatus based on the list and a correspondence table, wherein the providing apparatus determines the content file as corresponding to the one of the plurality of files containing menu data which has been deleted at the storing apparatus as a selection, and
(v) the providing apparatus transmits the selected content file to the storing apparatus by way of the transfer apparatus.

7. The content selecting system according to claim 6, wherein when receiving the plurality of files that contain menu data from the providing apparatus, the transfer apparatus deletes all the files previously stored in the storing apparatus and then transmits the plurality of files that contain menu data to the storing apparatus.

8. The content selecting system according to claim 6, wherein the menu data represents a menu image for each content category, and the providing apparatus determines based on the list and the correspondence table, the category of the menu image that has been deleted at the storing apparatus and determines based on the determined result, a category of the content that has been selected.

9. The content selecting system according to claim 8, wherein the content category includes at least one of news, weather, or fortune-telling.

10. The content selecting system according to claim 6, wherein the providing apparatus retains content files other than the file that corresponds to the deleted one of the plurality of files containing menu data.

11. The content selecting system according to claim 6, wherein the transfer apparatus and the storing apparatus are connected via a Universal Serial Bus (USB) connection.

12. The content selecting system according to claim 11, wherein the storing apparatus includes a controller and an operational unit, wherein the controller implements a mutual exclusion control that avoids collision between instructions received from the transfer apparatus and instructions received from the operational unit.

13. The content selecting system according to claim 12, wherein the controller is configured not to respond to any input from the operational unit while the USB connection with the transfer apparatus is turned on.

14. The content selecting system according to claim 12, wherein a user of the storing apparatus is permitted to operate the operational unit only when the USB connection between the transfer apparatus and the controller is turned off.

15. The content selecting system according to claim 12, wherein the controller interrupts reproduction of data by the storing apparatus while the USB connection with the transfer apparatus is turned on.

16. The content selecting system according to claim 12, wherein the operational unit includes a push-button type switch that is configured to be pushed by a user of the storing apparatus sending an operational input signal to the controller.

17. The content selecting system according to claim 16, wherein the operational input signal indicates erasure of the one of the plurality of files containing menu data.

18. The content selecting system according to claim 6, wherein the transfer apparatus and the providing apparatus are connected via Internet.

19. The content selecting system according to claim 6, wherein the storing apparatus includes a player configured to output the content file that is received from the transfer apparatus.

* * * * *